(12) United States Patent
Posz

(10) Patent No.: US 9,282,484 B2
(45) Date of Patent: Mar. 8, 2016

(54) TRAFFIC DETECTION FUNCTION WITH AN EXTERNAL ENFORCEMENT DEVICE

(71) Applicant: Verizon Patent and Licensing Inc., Arlington, VA (US)

(72) Inventor: Thomas G. Posz, Concord, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 86 days.

(21) Appl. No.: 14/191,114

(22) Filed: Feb. 26, 2014

(65) Prior Publication Data

US 2015/0245241 A1  Aug. 27, 2015

(51) Int. Cl.
  *H04W 4/00* (2009.01)
  *H04W 28/02* (2009.01)

(52) U.S. Cl.
  CPC ...... *H04W 28/0268* (2013.01); *H04W 28/0273* (2013.01)

(58) Field of Classification Search
  None
  See application file for complete search history.

(56) References Cited

U.S. PATENT DOCUMENTS

| | | | | |
|---|---|---|---|---|
| 8,374,081 | B2* | 2/2013 | Farrugia et al. | 370/229 |
| 8,630,925 | B2* | 1/2014 | Bystrom et al. | 705/30 |
| 8,732,043 | B2* | 5/2014 | Shaikh | 705/32 |
| 8,880,023 | B2* | 11/2014 | Goldner et al. | 455/406 |
| 2012/0087262 | A1* | 4/2012 | Rasanen et al. | 370/252 |
| 2013/0132854 | A1* | 5/2013 | Raleigh | G06F 3/0482 715/738 |
| 2015/0082345 | A1* | 3/2015 | Archer | H04L 65/605 725/34 |

OTHER PUBLICATIONS

"3GPP TS 23.203 V7.9.0," 3rd Generation Partnership Project, Technical Specification Group Services and Systems Aspects; Policy and Charging Control Architecture (Release 7); Dec. 16, 2008; Available at http://www.3gpp.org.
"3GPP TS 29.212 V12.3.0," 3rd Generation Partnership Project, Technical Specification Group Core Network and Terminals; Policy and Charging Control (PCC) (Release 12); Dec. 2013; Available at http://www.3gpp.org.

* cited by examiner

*Primary Examiner* — Frank Duong

(57) ABSTRACT

A policy control component may be installed in a telecommunication network as a "supplemental" or "proxy" policy control component that may be given limited interaction with the telecommunication network. The proxy policy control component may communicate with policy enforcement devices in an external network. In one implementation, a method may include monitoring a first network to obtain information relating to a traffic flow through a gateway associated with the first network, the gateway connecting the first network to a second network. The method may further include establishing a communication session with a policy enforcement device located within the second network; and transmitting over the communication session, and to the policy enforcement device, information relating to enforcement of network policy functions for the traffic flow.

20 Claims, 8 Drawing Sheets

TRAFFIC DETECTION FUNCTION WITH AN EXTERNAL ENFORCEMENT DEVICE

BACKGROUND

Telecommunications networks may provide connectivity to user devices, such as cellular telephones, in order to enable the user devices to place calls and/or participate in data services (e.g., web browsing, instant messaging, multimedia access, etc.).

A modern telecommunication network may include a policy and charging control architecture to enforce network policy (e.g., traffic Quality of Service (QoS) and charging information). For example, in a Long Term Evolution (LTE) based cellular network, the policy and charging control architecture may provide support for fine-grained QoS and enable the dynamic control of charging requirements of the services that are provided by the network. Dynamic control over QoS and charging can be important to assist operators of the telecommunication network in charging for and controlling operation of the telecommunication network.

DETAILED DESCRIPTION OF PREFERRED EMBODIMENTS

The following detailed description refers to the accompanying drawings. The same reference numbers in different drawings may identify the same or similar elements.

Techniques described herein may provide for a policy and charging control architecture in which a policy control component, such as an LTE Policy and Charging Rules Function (PCRF), may be installed in a telecommunication network as a "supplemental" or "proxy" policy control component that may be given limited interaction with the telecommunication network. For example, the proxy policy control component may be limited to passively monitoring communications in the telecommunication network. By giving the proxy policy component limited access to the telecommunication network, the proxy policy component may be physically unable to transmit messages into the telecommunication network and can thus be guaranteed to not affect the operation or stability of the telecommunication network.

In addition to the proxy policy control component, the telecommunication network may include a "normal" policy control component (e.g., a PCRF). An external policy enforcement device, such as an LTE Policy and Charging Enforcement Function (PCEF), corresponding to an external network (e.g., a network operated by an entity different than the entity that operates the telecommunication network associated with the normal policy control component and the proxy policy control component), may communicate with the proxy policy control component to perform policy enforcement for the external network.

Figure 1:
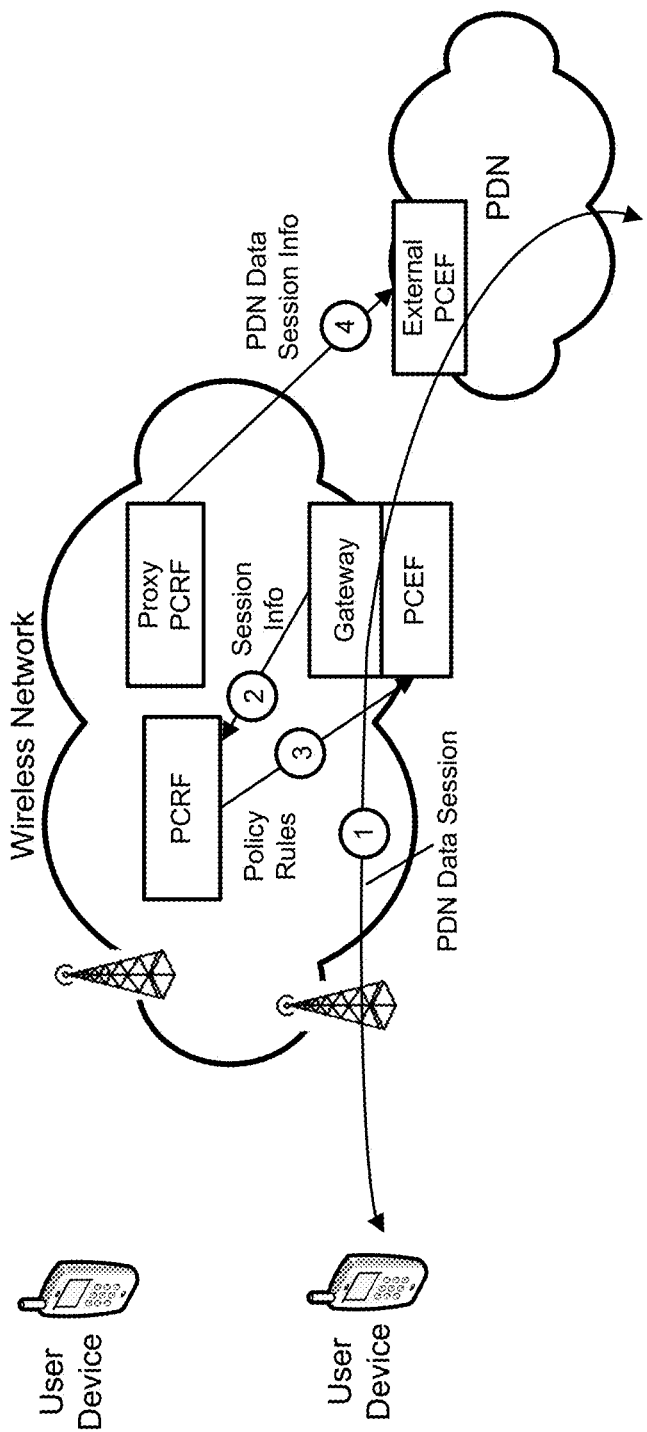
FIG. 1 is a diagram illustrating an example overview of an implementation described herein.

FIG. 1 is a diagram illustrating an example overview of an implementation described herein. In the example shown in FIG. 1, user devices (e.g., smart phones, tablets, or other mobile communication devices) may wirelessly communicate with a network ("wireless network"), such as a cellular telecommunication network. The telecommunication network may be, for example, an LTE based (e.g., 4G LTE) network that provides network connectivity to the user devices. In some situations, one of the user devices may connect, through the wireless network, to an external network, such as an external packet data network (PDN). The PDN may, for example, provide services such as Internet connectivity or connectivity to other services.

The wireless network may include a number of network elements related to policy and charging control functions. The policy and charging control functions may enable a network operator of the wireless network to dynamically control policy associated with traffic flows (e.g., which traffic flows to allow, QoS parameters for individual traffic flows, etc.) and to charge customers for the traffic flows. The policy and charging control functions may be implemented by a number of devices and/or logical components, including a PCRF component and a PCEF component. The PCRF component may provide policy control and flow-based charging control decisions. The PCEF component may implement the policies determined by the PCRF. The PCEF component may be implemented within or as part of a gateway that controls access to the PDN.

As is additionally shown in FIG. 1, the wireless network may include or be associated with a proxy PCRF component. The proxy PCRF may function similarly to the PCRF but may be given limited access to the wireless network. For example, the proxy PCRF may monitor certain communication sessions within the wireless network but be unable to transmit messages or commands to the PCEF (or other network devices in the wireless network). In one particular implementation, the proxy PCRF may be attached to the wireless network via a fiber tap, such as a fiber tab implemented at an interface between the PCRF and the PCEF. In this case, the proxy PCRF may be physically unable to transmit messages into the wireless network and can thus be guaranteed to not affect the operation or stability of the wireless network. In other implementations, the proxy PCRF may monitor the wireless network using other techniques, such as by monitoring other interfaces and/or network devices in the wireless network.

In the example of FIG. 1, one of the user devices is illustrated as having initiated a communication session with the PDN ("PDN data session," arrow "1"). For example, the user device, as part of requesting the communications session, may receive an Internet Protocol (IP) address from the gateway. The gateway may provide the IP address and other information (such as information used to identify the user device) to the PCRF ("session info," arrow "2"), which in turn may transmit one or more policy rules, that are to be applied to the data session, to the PCEF ("policy rules," arrow "3"). In this manner, the operator of the wireless network may enforce network policy with respect to the data session.

The operator of the PDN may also desire to enforce network policy with respect to the data session. The operator of the PDN may implement a device similar to the PCEF ("external PCEF") to apply network policies to the data session within the PDN. The external PCEF may communicate with the proxy PCRF to obtain information about the data session ("Data Session Info," arrow "4"). As previously mentioned, the proxy PCRF may monitor the communications between the PCRF and PCEF, and may thus be aware of and maintain information about the PDN data session. The proxy PCRF may identify the user device based on the PDN data session information. The external PCEF may use the obtained information to enforce network policy, within the PDN, for the data session.

By using a proxy PCRF, as described herein, a network operator may allow access to information, by an external entity, which may be useful by the external entity in implementing the external entity's own network policy and/or charging functions. The proxy PCRF, due to being given limited access (e.g., "read only" access to the network of the network operator), may be implemented by the network operator with a high level of confidence that the external entity will not be able to unintentionally or maliciously affect the operation of the network.

Figure 2:
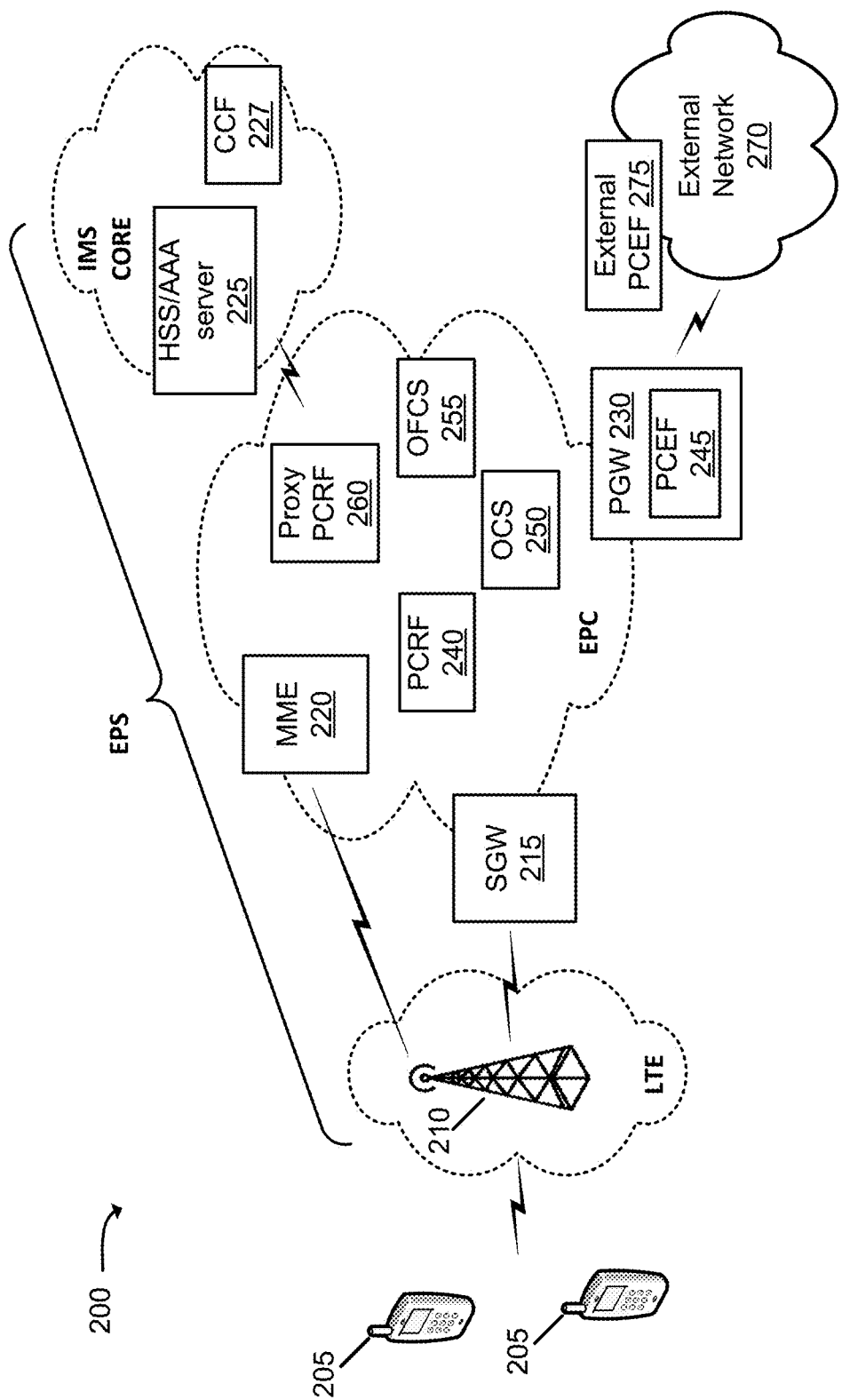
FIG. 2 illustrates an example environment in which systems and/or methods described herein may be implemented.

FIG. 2 illustrates an example environment 200 in which systems and/or methods described herein may be implemented. Environment 200 may include an evolved packet system ("EPS") that includes a LTE network and/or an evolved packet core ("EPC") network that operates based on a third generation partnership project ("3GPP") wireless communication standard. The LTE network may be, or may include, a radio access network ("RAN") that includes one or more base stations 210, some or all of which may take the form of an eNodeB ("eNB"), via which user devices 205 may communicate with the EPC network. The EPC network may include one or more serving gateways ("SGW") 215, mobility management entity devices ("MME") 220, and packet data network ("PDN") gateways ("PGW") 230. SGWs 215, MMEs 220, and/or PGWs 230, and may enable user devices 205 to communicate with external network 270, such as a packet data network, and and/or an Internet protocol ("IP") multimedia subsystem ("IMS") core network. The IMS core network may include HSS/AAA server 225, which may manage authentication, session initiation, account information, a user profile, etc. associated with user devices 205. The IMS core network may also include Charging Collection Function (CCF) 227.

Portions of environment 200, such as the EPS/EPC network, may additionally include one or more network elements that provide policy and charging control functions for the EPS/EPC network. As illustrated, these network elements may include PCRF 240, PCEF 245, online charging system (OCS) 250, offline charging system (OFCS) 255, and proxy PCRF 260. External network 270 may also include policy and charging control functions, such as policy enforcement functions implemented by external PCEF 275.

User devices 205 may include a computation and communication device, such as wireless mobile communication devices that are capable of communicating with one or more networks. For example, user devices 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a set-top device ("STD"), a personal gaming system, and/or another type of mobile computation and communication device. The user devices may obtain network connectivity through an IP Connectivity Access Network (IP-CAN) session established via the EPS network.

Base station 210 may include one or more network devices that receive, process, and/or transmit traffic, such as calls, audio, video, text, television programming content, and/or other data, destined for and/or received from user devices 205. In one example, base station 210 may be an eNB device and may be part of the LTE network. Base station 210 may receive traffic from and/or send traffic to external network 270 via SGW 215 and PGW 230. Base station 210 may send traffic to and/or receive traffic from user devices 205 via an air interface.

SGW 215 may include one or more network devices that gather, process, search, store, and/or provide information. For example, SGW 215 may include a gateway, a router, a modem, a switch, a firewall, a network interface card ("NIC"), a hub, a bridge, a proxy server, or some other type of device that processes and/or transfers traffic. SGW 215 may, for example, aggregate traffic received from one or more base stations 210 and may send the aggregated traffic to external network 270 and/or another network via PGW 230. SGW 215 may also aggregate traffic received from external network 270 and/or another network (e.g., via PGW 230) and may send the aggregated traffic to user devices 205 via one or more base stations 210.

MME 220 may include one or more computation and communication devices that gather, process, search, store, and/or provide information. For example, MME 220 may perform operations to register user devices 205 with the EPS, to establish bearer channels associated with a session with user devices 205, to hand off user devices 205 from the EPS to another network, to hand off user devices 205 from the other network to the EPS, and/or to perform other operations. MME 220 may perform policing operations on traffic destined for and/or received from user devices 205.

HSS/AAA server 225 may include one or more server devices, or other types of devices, that gather, process, search, store, and/or provide information. For example, HSS/AAA server 225 may manage, update, and/or store, in a memory associated with HSS/AAA server 225, profile information associated with a user, of mobile device 205, as part of providing access to services offered by the IMS network. The profile information may identify applications and/or services that are permitted for and/or accessible by the user; a mobile directory number ("MDN") and/or International mobile Subscriber Identity ("IMSI") associated with the user; bandwidth or data rate thresholds associated with the applications and/or services; information associated with the user (e.g., a username, a password, etc.); rate information; minutes allowed for a subscriber; and/or other information. Additionally, or alternatively, HSS/AAA server 225 may perform authentication, authorization, and/or accounting operations associated with the user and/or a communication session with user device 205. CCF 227 may collect charging related data for IMS services, such as charging information related to charging duration, timing, and other session details, and may transmit the collected charging related data to a billing system.

PGW 230 may include one or more network devices, or other types of computation and communication devices, that gather, process, search, store, and/or provide information in a manner described herein. For example, PGW 230 may include a gateway, a router, a modem, a switch, a firewall, a NIC, a hub, a bridge, a proxy server, an optical add-drop multiplexer ("OADM"), and/or some other type of device that processes and/or transfers traffic. PGW 230 may aggregate traffic received from one or more SGWs 215, and may send the aggregated traffic to external network 270. PGW 230 may also, or alternatively, receive traffic from external network 270 and may send the traffic toward user device 205 via SGW 215, and/or base station 210.

PCRF 240 may include one or more server devices that provide policy and charging control decisions. PCRF 240 may receive information regarding policies and/or subscriptions from one or more sources, such as subscriber databases and/or from one or more users (such as, for example, an administrator associated with PCRF 240). PCRF 240 may provide policy information, such as specific QoS policies that should be enforced for a particular traffic flow, to PCEF 245.

PCEF 245 may implement policy and charging enforcement functions for traffic flows in the EPS/EPC network. For example, PCEF 245 may enforce, on behalf of PCRF 240, gating and QoS functions for traffic flows. PCEF 245 may enforce the gating and QoS functions based on inspection of packets passing through PCEF 245. As one example, PCEF 245 may limit the bit rate of a particular traffic flow to a particular value. In one implementation, PCEF 245 may be implemented within PGW 230. Alternatively or additionally, PCEF 245 may be a separate component that is implemented by one or more server devices.

OCS 250 may include one or more devices that provides credit management and may grant credits to PCEF 245 based on time, traffic volume, or chargeable events. In this context, "credits" may refer to a value, associated with a particular customer of the network, which indicates a quantity of data that the customer has purchased. OCS 250 may maintain charging or billing information relating to the credits that have been used by customers. OCS 250 may additionally be responsible for correlating charging events to ensure that the correct customers are charged for the particular charging events.

OCFS 255 may include one or more server devices that implement off-line charging functions. For example, OCFS 255 may receive indications of charging events from PCEF 245 and may generate corresponding charging data records (CDRs) for a billing system.

As mentioned previously, PCRF 240, PCEF 245, OCS 250, and OFCS 245 may together function to provide policy and charging control functions for an operator of the EPS/EPC network. PCRF 240, PCEF 245, OCS 250, and OFCS 245 may provide dynamic control of policy and charging control functions on a per flow and per subscriber basis.

Proxy PCRF 260 may include one or more devices that provide policy control and flow based charging control decisions that may be used by enforcement functions external to the EPS/EPC network. Proxy PCRF 260 may function similarly to PCRF 240 but may be given limited access to the EPS/EPC network. For example, proxy PCRF 260 may: monitor a Gx interface between PCRF 240 and PCEF 245, monitor a Gy interface between PGW 230 and OCS 250 (for network credit information), monitor a Gz interface between PGW 230 and OFCS 255, and/or may monitor a Rf interface between PGW 230 and CCF 227.

In some implementations, proxy PCRF 260 may passively monitor the various interfaces such that proxy PCRF 260 may not be physically capable of affecting the operation of the EPS/EPC. Proxy PCRF 260 may thus not be known or be discoverable by other network elements in the EPS/EPC network. For example, proxy PCRF 260 may use a fiber tap, associated with a fiber optic cable, to monitor the Gx interface between PCRF 240 and PCEF 245. Proxy PCRF 260 may communicate with external networks, such as external network 270, to provide information relating to policy control and flow based charging. For example, proxy PCRF 260 may communicate with external PCEF 275 to provide identification information relating to traffic flows, policy decisions relating to traffic flows, and/or to provide other information.

External network 270 may include one or more wired and/or wireless networks. For example, external network 270 may include a wide area network ("WAN"), a metropolitan area network ("MAN"), the Internet, a fiber optic-based network, and/or a combination of these or other types of networks. External network 270 may be communicatively coupled to one or more other networks, such as to the EPS/EPC network (e.g., via PGW 230).

In some implementations, external network 270 may be operated by a telecommunications provider that is different from a telecommunications provider that operates the EPS/EPC network (e.g., external network 270 may not be implicitly trusted by the operator of the EPS/EPC network). The operator of external network 270 may implement external PCEF 275 to provide policy and charging enforcement functions similar to functions provided by PCEF 245. External PCEF 275 may obtain policy-related information from proxy PCRF 260. For example, external PCEF 275 may obtain traffic flow and/or subscriber identification information, and/or other information, from proxy PCRF 260. In one implementation, the interface between proxy PCRF 260 and external PCEF 275 may be the only signaling interface between the EPS/EPC network and external PCEF 275. External network 270 may be separated from the EPS/EPC network by a relatively long distance, potentially resulting in lag in communications between external network 270 and the EPS/EPC network.

Figure 3:
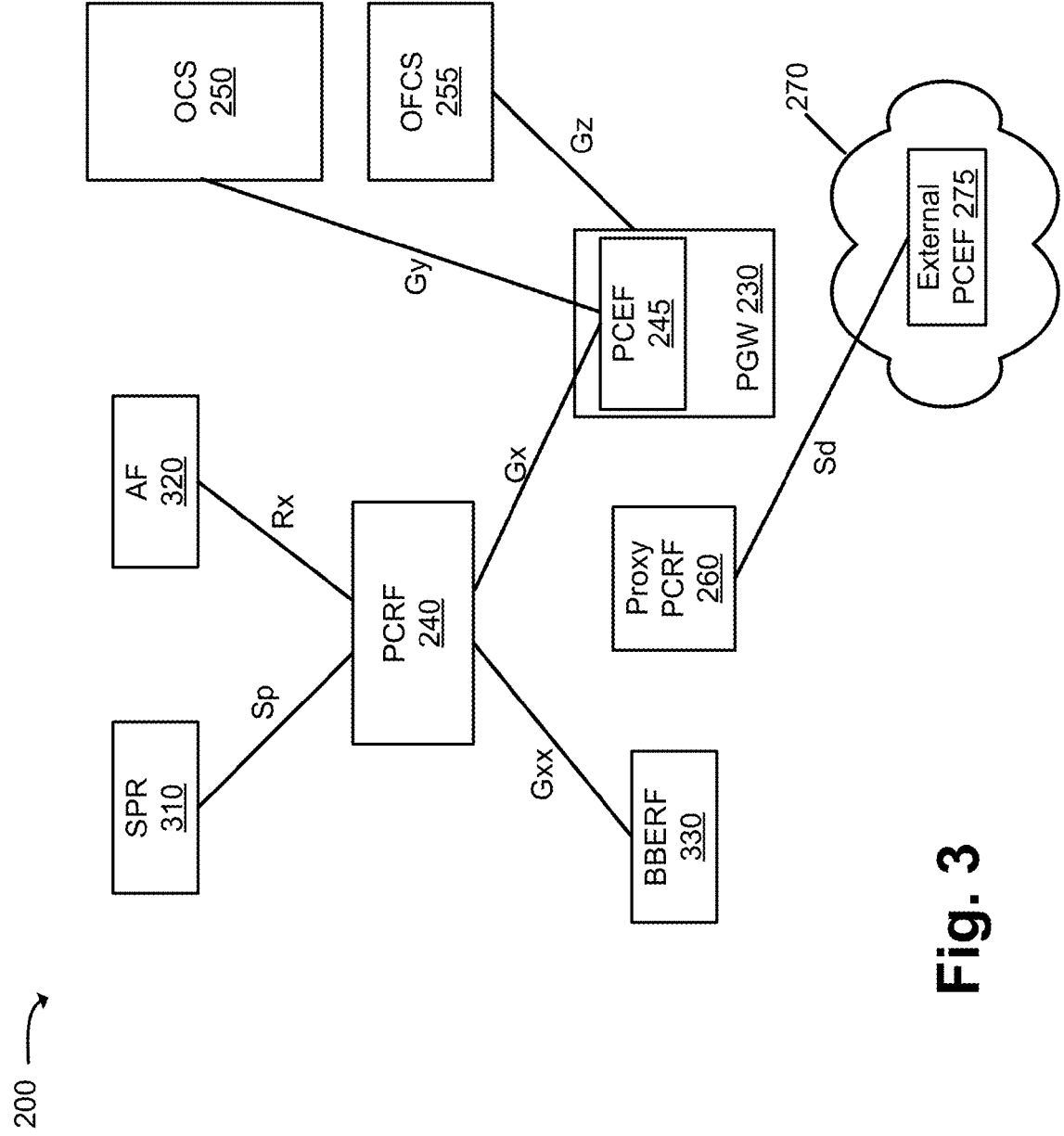
FIG. 3 illustrates an example of a portion of an environment relating to policy and charging functions.

FIG. 3 illustrates an example of a portion of environment 200 relating to policy and charging functions. For brevity, components that are shown in FIG. 3 and that were described previously with respect to FIG. 2 may not be described again. FIG. 3 additionally illustrates an example of interfaces that may be implemented between the various components. An "interface" between network components, as used herein, may refer to protocol(s) and/or data definitions that allow two components to communication with one another. A number of different interfaces relating to LTE networks are defined by the 3rd Generation Partnership Project (3GPP).

As illustrated in FIG. 3, environment 200 may additionally include subscriber profile repository (SPR) 310, application function (AF) 320, and bearer binding and event reporting function (BBERF) 330. SPR 310, AF 320, and BBERF 330 may be associated with the EPS/EPC network. SPR 310 may include one or more devices to maintain, on a per-packet data network (PDN) basis, subscriber/subscription information. More particularly, SPR 310 may store, on a per-PDN basis, a subscriber's allowed services, information relating to a subscriber's allowed QoS, and subscriber related charging information for particular PDNs. SPR 310 may provide this information to PCRF 240 using, for example, an Sp interface.

AF 320 may include one or more server devices that interact with applications or services, such as application or services that use dynamic policy and charging functions. AF 320 may extract session information from application signaling and provide it to PCRF 240 using, for example, an Rx interface. AF 320 may provide, to PCRF 240, application session related information such as: subscriber identifier information, an IP address of the user device, media type and format information, bandwidth information, flow description (e.g., source and destination IP addresses information), and/or additional information.

BBERF 330 may include one or more devices that may enforce policy decisions. BBERF 330 may support a subset of the functionality provided by PCEF 245. PCRF 240 may communicate with BBERF 330 using, for example, the Gxx interface.

As is additionally shown in FIG. 3, PCRF 240 and PCEF 245 may communicate using the Gx interface, proxy PCRF 260 and external PCEF 275 may communicate using the Sd interface, OCS 250 and PCEF 245 may communicate using the Gy interface, and OFCS 255 and PGW 230 may communicate using the Gz interface.

The quantity of devices and/or networks, illustrated in FIGS. 2 and 3, is provided for explanatory purposes only. In practice, environment 200 may include additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Also, while devices in FIG. 3 are shown as communicating via particular interfaces, in practice, the devices in FIG. 3 may communicate via different interfaces than what is shown and described herein.

Figure 4:
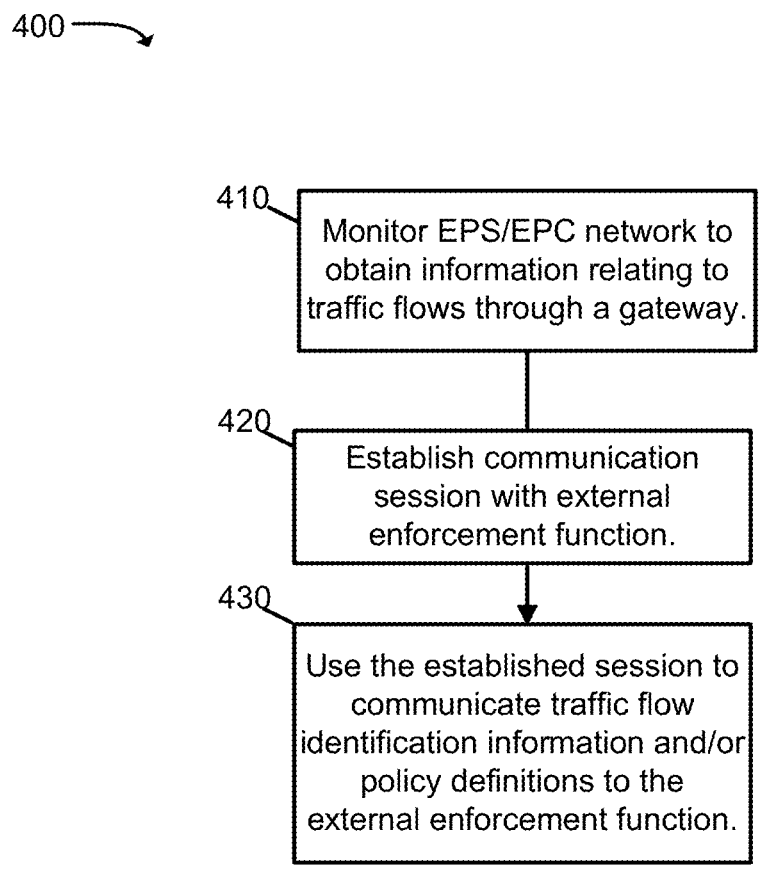
FIG. 4 is a flowchart illustrating an example process relating to the use of an external enforcement function.

FIG. 4 is a flowchart illustrating an example process 400 relating to the use of an external enforcement function. In one implementation, process 400 may be performed by proxy PCRF 260.

Process 400 may include monitoring the EPS/EPC network to obtain information on traffic flows through a gateway (block 410). For example, proxy PCRF 260 may monitor the EPS/EPC network obtain the information on the traffic flows through a gateway, such as PGW 230. The traffic flow information may generally include user session state information. The traffic flow information may also include information identifying user devices 205 that are associated with the traffic flows through PGW 230, traffic credit information associated with traffic flows through PGW 230, and/or other information associated with traffic flows through PGW 230. The information relating to identification of a user device 205 may include, for example, IP addressing information of user device 205, network address identifier (NAI) permission, an International Mobile Subscriber Identity (IMSI) value, a Mobile Subscriber Integrated Services Digital Network-Number (MSISDN) value, or other information.

The monitoring may be performed passively with respect to the one or more devices in the EPS/EPC network (e.g., devices related to policy and charging control functions). For example, proxy PCRF 260 may monitor communications via Rf, Gy, Gx, and/or Gz interfaces associated with devices that communicate with PGW 230. Proxy PCRF 260 may monitor the communications via these interfaces to receive the information relating to the traffic flows transmitted through PGW 230.

As previously mentioned, in some implementations, the monitoring of the communication via the interfaces, by proxy PCRF 260, may be performed using a technique that can be guaranteed to not affect the operation of the EPS/EPC network, such as by using network cable taps (e.g., a fiber tap) that allows traffic to be monitored but not affected by the tap (e.g., the tap may be unable to transmit messages into the network). In other possible limitations, other techniques for providing monitoring of the EPS/EPC network may be used, such as a technique in which proxy PCRF 260 directly communicates with PCRF 240 and/or with PGW 230.

Process 400 may further include establishing a communication session with an external enforcement function (block 420). For example, proxy PCRF 260 initiate a distinct Sd session with external PCEF 275.

Process 400 may further include using the established session to communicate traffic flow identification information and/or policy definitions to the external enforcement function (block 430). The policy definitions may include, for example, policy definitions that are input to proxy PCRF 260 by, for example, an operator of the EPS/EPC network or an operator of external network 270. In one implementation, the external enforcement function may include external PCEF 275. The information communicated to external PCEF 275 may be information used to identify the mobile device associated with a traffic flow that traverses external network 270 (e.g., an IMSI value, a MSISDN value, etc.). In response, external PCEF 275 may use the received information to implement policy and/or charging functions with respect to the traffic flow. For example, external PCEF 275 may inspect packets to determine whether the packets belong to a particular traffic flow and may corresponding implement QoS filtering, gateway filtering, or other policy enforcement functions on the particular traffic flow.

FIGS. 5-8 are diagrams illustrating examples of techniques to obtain information relating to traffic flows through a gateway. As discussed previously, proxy PCRF 260 may obtain the information by monitoring the EPS/EPC network.

Figure 5:
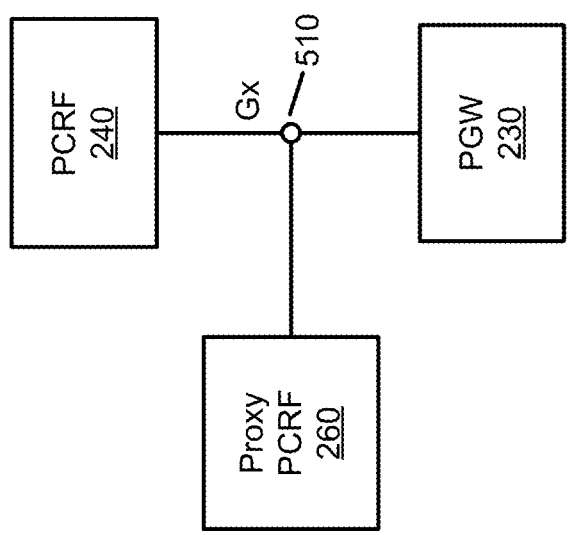

As illustrated in FIG. 5, proxy PCRF 260 may monitor the Gx interface between PCRF 240 and PGW 230 to obtain message flows. For example, a tap 510, such as a fiber tap, may be used to monitor the Gx interface. Tap 510 may be used to obtain a copy of the messages that are exchanged using the Gx interface.

Figure 6:
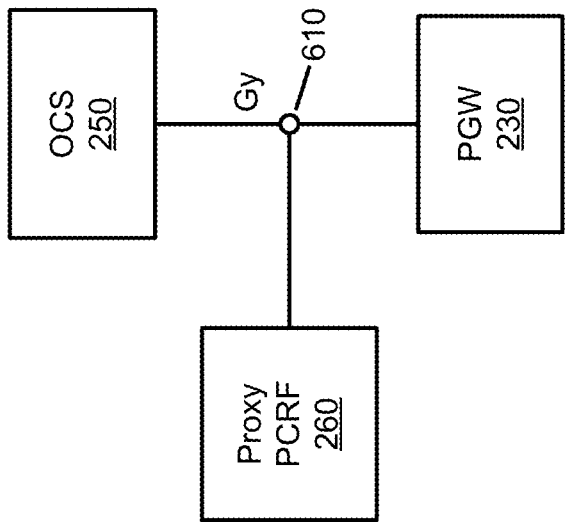
FIGS. 5-8 are diagrams illustrating example techniques used to obtain information relating to traffic flows through a gateway.
Figure 8:
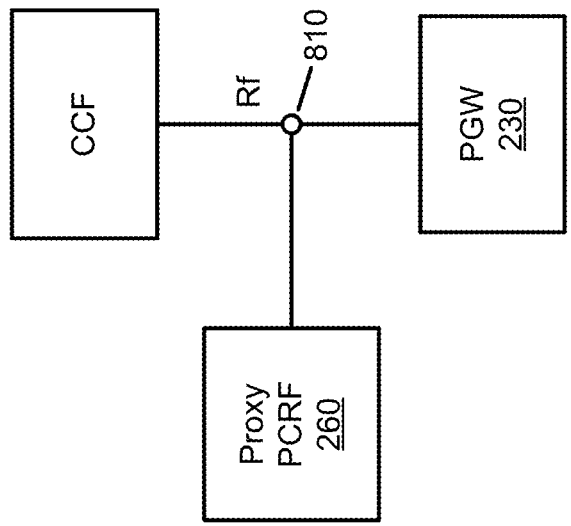
Figure 7:
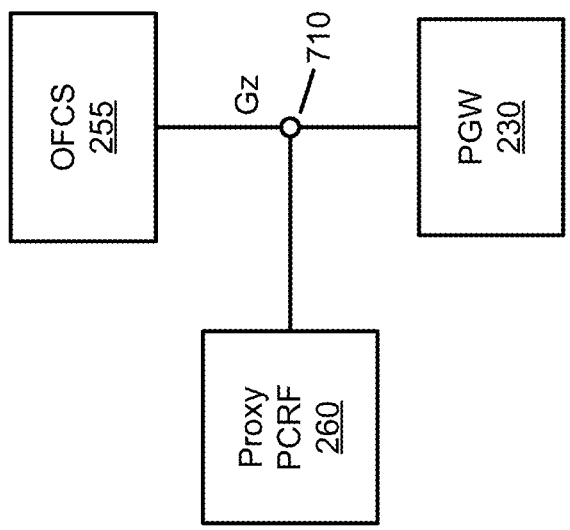

As illustrated in FIG. 6, proxy PCRF 260 may monitor the Gy interface between PGW 230 and OCS 250. A tap 610, similar to tap 510, may be used to monitor the Gy interface to obtain a copy of the messages that are exchanged using the Gy interface. Similarly, as illustrated in FIG. 7, proxy PCRF 260 may monitor the Gz interface between OFCS 255 and PGW 230. A tap 710, similar to tap 510, may be used to monitor the Gz interface to obtain a copy of the messages that are exchanged using the Gz interface. As illustrated in FIG. 8, proxy PCRF 260 may monitor the Rf interface between PGW 230 and a charging collection function (CCF) component. A tap 810, similar to tap 510, may be used to obtain a copy of the messages that are exchanged using the Rf interface.

In various implementations, proxy PRCF 260 may use one of the techniques illustrated in FIGS. 5-8 or a combination of the techniques to obtain information relating to traffic flows through a gateway. In other implementations, other techniques could be used to obtain information relating to traffic flows through a gateway.

Figure 9:
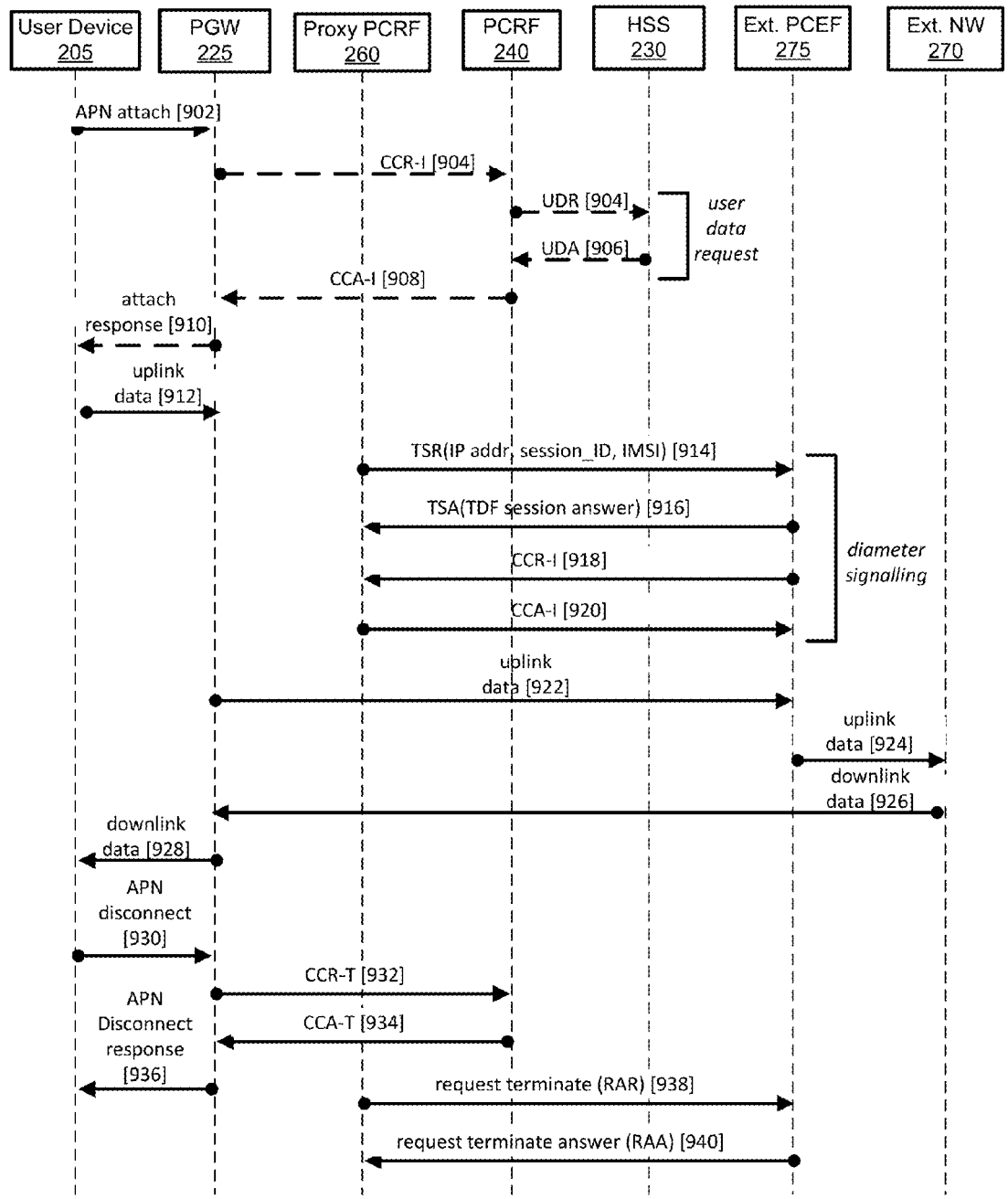
FIG. 9 illustrates an example signal flow relating to policy enforcement using an external enforcement function.

FIG. 9 illustrates an example signal flow relating to policy enforcement using an external PCEF.

As shown in FIG. 9, user device 205 may request a bearer session with external network 270 (e.g., an IP connection to an external network that provides Internet connectivity). PGW 230 may receive the request ("access point name (APN) attach," at 902). In response, PGW 230 may provide an external bearer session to an external network 270. The carrier network (e.g., the EPS/EPC network) may thus be responsible for providing connectivity to external network 270.

As part of the establishment of the bearer session with external network 270, PGW 230 may transmit a credit control request (CCR-I) to PCRF 240 (at 904). The credit control request may be part of existing policy and charging control functions. The credit control request may be performed over the Gx interface. PCRF 240 may obtain a subscriber profile corresponding to user device 205, such as by obtaining the subscriber profile from HSS/AAA server 225. As illustrated, the subscriber profile may be obtained via a user data request (UDR) message (at 904) that may be transmitted from PCRF 240 to HSS 230. HSS 230 may respond with a user data answer (UDA) message (at 906). PCRF 240 may transmit a credit control answer (CCA-I) to PGW 230 (at 908). PGW 225 may respond to the attach request (at 910).

At this point, user device 205 may transmit data (uplink data) to external network 270. The uplink data flows may pass through PGW 225 (at 912) and external PCEF 275 (at 924). Other network devices may transmit and/or process the uplink data. For example, an external router, such as an edge router, may be associated with external network 270. The external router may receive the uplink data from PGW 225, transmit the uplink data to external PCEF 275 for policy control filtering, and may receive the filtered uplink data back from external PCEF 275. The policy control filtering, as previously discussed, may include correlating the information from proxy PCRF 260 to determine appropriate data sessions to filter, and enforcing policy functions on the data sessions.

Proxy PCRF 260, as previously discussed, may monitor the various interfaces associated with PGW 230 (e.g., Rf, Gy, and Gx interfaces) and/or directly communicate with PGW 230 to obtain information relating to the traffic flows through PGW 230. Proxy PCRF 260 may initiate a Sd session (e.g., as part of diameter signalling) with external PCEF 275. The Sd session may be used to provide identification information, relating to user device 205, and/or policy rules. In one implementation, proxy PCRF 260 may initiate the Sd session with a Traffic Detection Function (TDF)-session request (TSR) and external PCEF 275 may respond with a TDF-session answer (TSA) response. In some situations, a CCR-I/CCR-A sequence may also be exchanged between proxy PCRF 260 and external PCEF 275. In this example, as shown, proxy PCRF 260 may transmit identification information, relating to user device 205, to external PCEF 275 (e.g., as part of the TSR). The identification information may include IP addresses, session identifiers, and IMSI values associated with user device 205 (at 914 and 916). Additionally, CCR-I and CCA-I messages may be exchanged (at 918 and 920).

Downlink data (e.g., data streams that terminate at user device 205) traffic is also illustrated in FIG. 9 (at 926 and 928).

At some point, the bearer session may be terminated (at 930 and 936). Termination of the session may cause CCR-T and CCA-T messages to be exchanged between PGW 225 and PCRF 240 (at 932 and 934). Proxy PCRF 260 may monitor these messages and correspondingly determine to terminate the Sd session with external PCEF 275 (at 938 and 940). Termination of the Sd session with external PCEF 275 may cause, for example, external PCEF 275 to remove any associated Sd state information.

Figure 10:
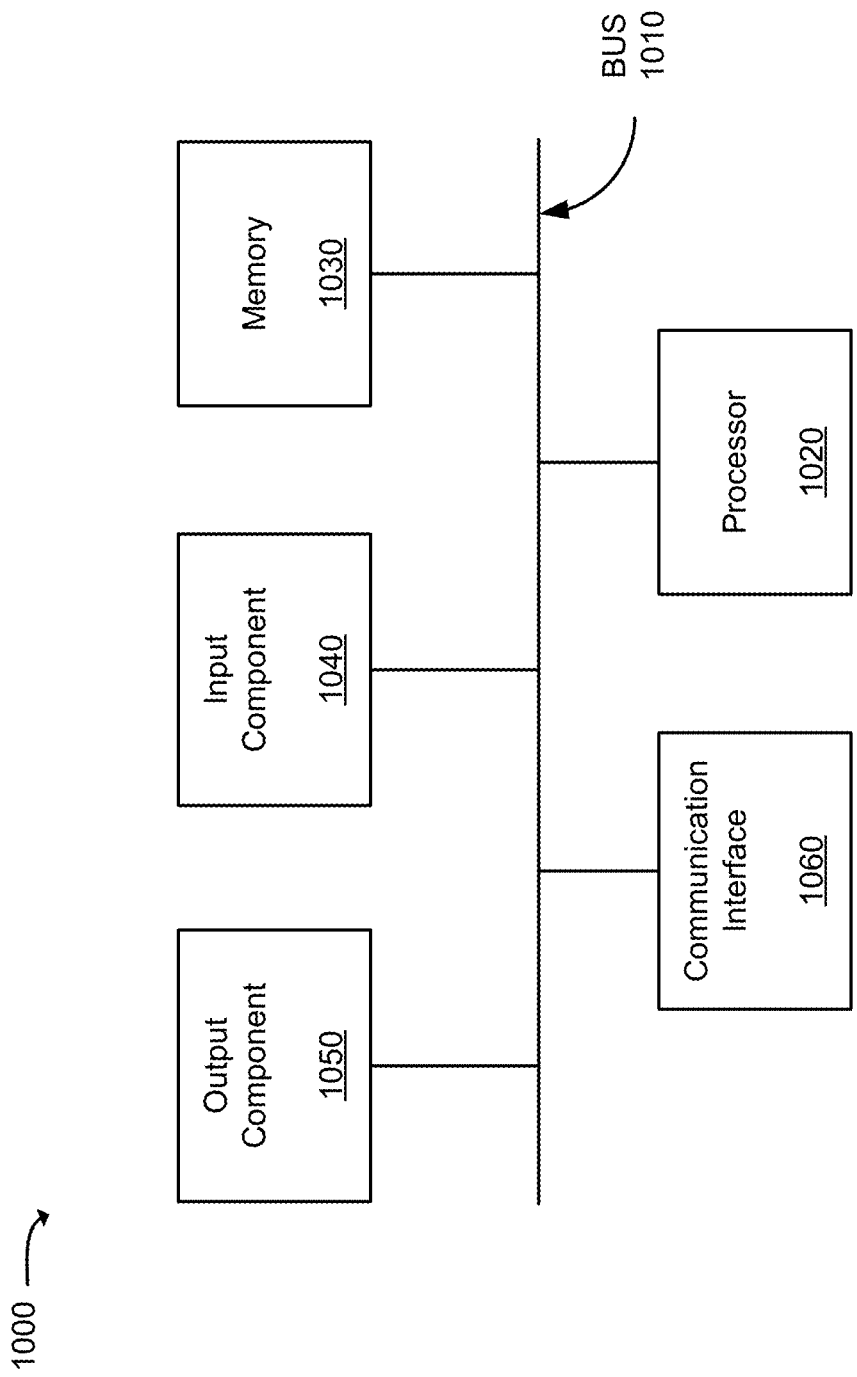
FIG. 10 is a diagram of example components of a device.

FIG. 10 is a diagram of example components of device 1000. One or more of the devices described above (e.g., as described with respect to FIGS. 1-3 and 5-9) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, a Wi-Fi radio, a cellular radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIG. 4, the order of the blocks may be modified in other implementations. Further, non-dependent blocks may be performed in parallel. In some implementations, additional blocks may be performed before, after, or in between the described blocks.

Additionally, while series of signals have been described with regard to FIG. 9, the order of the signals may be modified in other implementations. Also, non-dependent signals may be sent and/or received in parallel. In some implementations, additional signals may be transmitted before, after, or in between the described signals.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1-3 and 5-8), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    monitoring, by a device, a first network to obtain information relating to a traffic flow through a gateway associated with the first network, the gateway connecting the first network to a second network, the second network being different from the first network, the monitoring including passively monitoring the first network such that other devices, associated with the first network, are not affected by operation of the device;
    establishing, by the device, a communication session with a policy enforcement device located within the second network; and
    transmitting, by the device, over the communication session, and to the policy enforcement device, information relating to enforcement of network policy functions for the traffic flow.

2. The method of claim 1, wherein the information relating to enforcement of the network policy functions includes information identifying a user device that obtains network connectivity from the first network.

3. The method of claim 1, wherein the information relating to enforcement of the network policy functions includes network policies relating to quality of service (QoS) or charging policies.

4. The method of claim 1, wherein the passively monitoring of the first network further includes:
    passively monitoring:
        a Gx interface between a Policy and Charging Rules Function (PCRF) device and a Packet Data Network Gateway (PGW) device,
        a Gy interface between an Online Charging System (OCS) and the PGW device,
        a Gz interface between an Offline Charging System (OFCS) and the PGW device, or
        a Rf interface between a Charging Collection Function (CCF) device and the PGW device.

5. The method of claim 4, wherein the passively monitoring further includes:
    receiving copies of messages transmitted over the Gx, Gy, Gz, or Rf interfaces by a fiber optic tap, the fiber optic tap being unable to transmit messages via the interfaces.

6. The method of claim 1, wherein the device is connected to the first network via a fiber optic tap that will not forward messages, from the device, to the first network.

7. The method of claim 1, wherein the first network includes a core network for a wireless cellular network that is operated by a telecommunications provider and the second network includes a network that is an external network relative to the telecommunications provider.

8. The method of claim 1, wherein the device implements a Policy and Charging Rules Function (PCRF) device and the policy enforcement device implements a Policy and Charging Enforcement Function (PCEF).

9. The method of claim 1, wherein the communication session established with the policy and enforcement device includes a communication session implemented over a Sd interface.

10. A network device comprising processing circuitry to:
    monitor a first network to obtain information relating to a traffic flow through a gateway associated with the first network, the gateway connecting the first network to a second network, the second network being different from the first network, the monitoring of the first network including passively monitoring the first network such that other devices, associated with the first network, are not affected by operation of the device;
    establish a communication session with a policy enforcement device located within the second network; and
    transmit, over the communication session, and to the policy enforcement device, information relating to enforcement of network policy functions for the traffic flow.

11. The network device claim 10, wherein the information relating to enforcement of the network policy functions includes information identifying a user device that obtains network connectivity from the first network.

12. The network device of claim 10, wherein the information relating to enforcement of the network policy functions includes network policies relating to quality of service (QoS) or charging policies.

13. The network device of claim 10, wherein the processing circuitry is further to:
    passively monitor:
        a Gx interface between a Policy and Charging Rules Function (PCRF) device and a Packet Data Network Gateway (PGW) device,
        a Gy interface between an Online Charging System (OCS) and the PGW device,
        a Gz interface between an Offline Charging System (OFCS) and the PGW device, or
        a Rf interface between a Charging Collection Function (CCF) device and the PGW device.

14. The network device of claim 13, wherein the passively monitoring further includes:
    receiving copies of messages transmitted over the Gx, Gy, Gz, or Rf interfaces by a fiber optic tap, the fiber optic tap being unable to transmit messages to the interfaces.

15. The network device of claim 10, wherein the network device is connected to the first network via a fiber optic tap that will not forward messages, from the network device, to the first network.

16. The network device of claim 10, wherein the processing circuitry is further to:
    implement a Policy and Charging Rules Function (PCRF) device and the policy enforcement device implements a Policy and Charging Enforcement Function (PCEF).

17. A system comprising:
a Policy and Charging Rules Function (PCRF) component, included within a first network, to provide policy and charging control decisions for traffic flows associated with the first network;
a Policy Charging Enforcement Function (PCEF) component, included within the first network and associated with a gateway of the first network, to provide policy and charging enforcement functions for the traffic flows;
a proxy PCRF component, included within the first network, to:
 passively monitor communications between the PCRF and PCEF, and
 transmit, to an external PCEF component associated with a second network, different than the first network, information relating to enforcement of network policy functions for the traffic flows, the information being obtained based on the monitored communications.

18. The system of claim 17, wherein the information relating to enforcement of the network policy functions includes information identifying a user device that obtains network connectivity from the first network.

19. The system of claim 17, wherein the information relating to enforcement of the network policy functions includes network policies relating to quality of service (QoS) or charging policies.

20. The system of claim 17, further comprising:
a fiber optic tap to transmit messages to the proxy PCRF component as part of the passively monitoring of the communications with the gateway.

* * * * *